United States Patent
Mohanty et al.

(10) Patent No.: US 12,086,265 B2
(45) Date of Patent: Sep. 10, 2024

(54) AUTOMATICALLY PERFORMING VARIED SECURITY SCANS ON DISTRIBUTED FILES USING MACHINE LEARNING TECHNIQUES

(71) Applicant: Dell Products L.P., Round Rock, TX (US)

(72) Inventors: Bijan Kumar Mohanty, Austin, TX (US); Vinotth Ramalingam, Plugerville, TX (US); Subramanya Padubidri, Bangalore (IN); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 17/579,073

(22) Filed: Jan. 19, 2022

(65) Prior Publication Data
US 2023/0229782 A1    Jul. 20, 2023

(51) Int. Cl.
*G06F 21/57*      (2013.01)
*G06F 18/214*     (2023.01)
(Continued)

(52) U.S. Cl.
CPC .......... *G06F 21/577* (2013.01); *G06F 18/214* (2023.01); *G06F 21/54* (2013.01);
(Continued)

(58) Field of Classification Search
CPC ...... G06F 21/577; G06F 18/214; G06F 21/54; G06F 2221/033; G06F 18/24;
(Continued)

(56) References Cited

U.S. PATENT DOCUMENTS

| | | | |
|---|---|---|---|
| 10,621,346 B1 * | 4/2020 | Singh | H04L 9/3239 |
| 2008/0092237 A1 * | 4/2008 | Yoon | G06F 21/577 726/25 |

(Continued)

FOREIGN PATENT DOCUMENTS

WO  WO-2020046575 A1 *  3/2020  ............ G06F 11/079

OTHER PUBLICATIONS

Xiaopeng Tian • Di Tang A Distributed Vulnerability Scanning on Machine Learning 2019 6th International Conference on Information Science and Control Engineering (ICISCE) pp. 33-35 (Year: 2019).*

(Continued)

*Primary Examiner* — Carl G Colin
*Assistant Examiner* — Habibullah
(74) *Attorney, Agent, or Firm* — Ryan, Mason & Lewis, LLP

(57) ABSTRACT

Methods, apparatus, and processor-readable storage media for automatically performing varied security scans on distributed files using machine learning techniques are provided herein. An example computer-implemented method includes obtaining at least one input file from one of multiple source channels; identifying a data security scan operation, from a set of multiple data security scan operations, for the at least one input file by processing historical data attributed to the at least one input file using machine learning techniques; executing the identified data security scan operation on the at least one input file; generating a hash of the at least one input file and information pertaining to results of the executed data security scan operation; caching the generated hash in at least one cache; and performing automated actions based on the caching of the generated hash in the at least one cache.

20 Claims, 9 Drawing Sheets

(51) Int. Cl.
    *G06F 21/54*     (2013.01)
    *G06N 20/20*     (2019.01)
    *H04L 9/32*      (2006.01)

(52) U.S. Cl.
    CPC ........... *G06N 20/20* (2019.01); *H04L 9/3239* (2013.01); *G06F 2221/033* (2013.01)

(58) Field of Classification Search
    CPC ...... G06F 21/562; G06N 20/20; G06N 3/045; G06N 5/01; H04L 9/3239
    See application file for complete search history.

(56) References Cited

U.S. PATENT DOCUMENTS

| | | | | |
|---|---|---|---|---|
| 2012/0324578 | A1* | 12/2012 | Seinfeld | G06F 1/3206 713/340 |
| 2014/0189859 | A1* | 7/2014 | Ramanan | H04L 67/1095 726/22 |
| 2020/0076835 | A1* | 3/2020 | Ladnai | H04L 63/1408 |
| 2020/0394566 | A1* | 12/2020 | Martín | G06N 20/20 |
| 2022/0078203 | A1* | 3/2022 | Shakarian | G06F 16/951 |

OTHER PUBLICATIONS

Wikipedia, VirusTotal, https://en.wikipedia.org/w/index.php?title=VirusTotal&oldid=1066450452 , Jan. 18, 2022.
Crowdstrike, State of the Endpoint, White Paper, 2017.

\* cited by examiner

```
import hashlib
def sha256fileHash(filename):
    h = hashlib.sha256()
    b = bytearray(128*1024)
    mv = memoryview(b)
    with open(filename, 'rb', buffering=0) as f:
        for n in iter(lambda : f.readinto(mv), 0):
            h.update(mv[:n])
    return h.hexdigest()

hash = sha256fileHash("Test1.txt")
print(hash)
2eb8e1992638xxxx6712a62xxxx803fa537c139d9d48xx4b03f07c2833xx093a
```

```
import numpy as np
import pandas as pd
from sklearn.model_selection import train_test_split
from sklearn.ensemble import RandomForestClassifier
from sklearn.metrics import accuracy_score
from sklearn.metrics import confusion_matrix
from sklearn.tree import DecisionTreeClassifier
from sklearn import tree import warnings filter
from warnings import simplefilter
# ignore all future warnings
simplefilter(action='ignore', category=FutureWarning)
```

```
runtime_data = pd.read_csv("data/fileScanData.csv", sep=',', header=None)

X = runtime_data.values[:, 1:6]
Y = runtime_data.values[:,0]

# Split the data into training(70%) and testing(30%) sets
X_train, X_test, Y_train, Y_test = train_test_split( X, Y, test_size = 0.3, random_state = 42)
```

```
# Train model using training data
trained_model = RandomForestClassifier(criterion='entropy')
trained_model.fit(X_train, Y_train)

predictions = trained_model.predict(X_test)

# Train and Test Accuracy
print("Train Accuracy :: ", accuracy_score(Y_train, trained_model.predict(X_train)))
print("Test Accuracy :: ", accuracy_score(Y_test, predictions))
print("Confusion matrix ", confusion_matrix(Y_test, predictions))
```

FIG. 6

AUTOMATICALLY PERFORMING VARIED SECURITY SCANS ON DISTRIBUTED FILES USING MACHINE LEARNING TECHNIQUES

FIELD

The field relates generally to information processing systems, and more particularly to techniques for providing security in such systems.

BACKGROUND

Transferring data within and across enterprises commonly includes passing files. There can be multiple channels through which a file can be sent and/or received. Irrespective of the channel of file transfer, most enterprises aim to scan the file for security threats (e.g., viruses) before the file is stored and/or used inside the enterprise network. There are many virus scanning software offerings from different providers, but such offerings typically work in a specific manner and/or in connection with limited types of security threats. Such variability can result in security gaps when using conventional data security approaches which typically rely exclusively on one or more particular scanning software offerings.

Additionally, conventional data security approaches lack a centralized approach to enforce scanning, which introduces redundancy (e.g., scanning the same file or type of file more than once), and can affect the performance of various applications and application programming interfaces (APIs).

SUMMARY

Illustrative embodiments of the disclosure provide techniques for automatically performing varied security scans on distributed files using machine learning techniques. An exemplary computer-implemented method includes obtaining at least one input file from one of multiple source channels, and identifying a data security scan operation, from a set of multiple data security scan operations, for the at least one input file by processing historical data attributed to the at least one input file using one or more machine learning techniques. The also includes executing the identified data security scan operation on the at least one input file, and generating a hash of the at least one input file and information pertaining to results of the executed data security scan operation. Additionally, the method includes caching the generated hash in at least one cache, and performing one or more automated actions based at least in part on the caching of the generated hash in the at least one cache.

Illustrative embodiments can provide significant advantages relative to conventional data security approaches. For example, problems associated with redundancy and security gaps are overcome in one or more embodiments through automatically performing varied security scans on distributed files using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 4 shows an example code snippet for implementing a multi-class classification using a random forest algorithm to identify a data security scan operation for a given file in an illustrative embodiment.

FIG. 6 shows an example code snippet creating a random forest classifier using a SciKitLearn (sklearn) library with the criterion hyperparameter as entropy in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
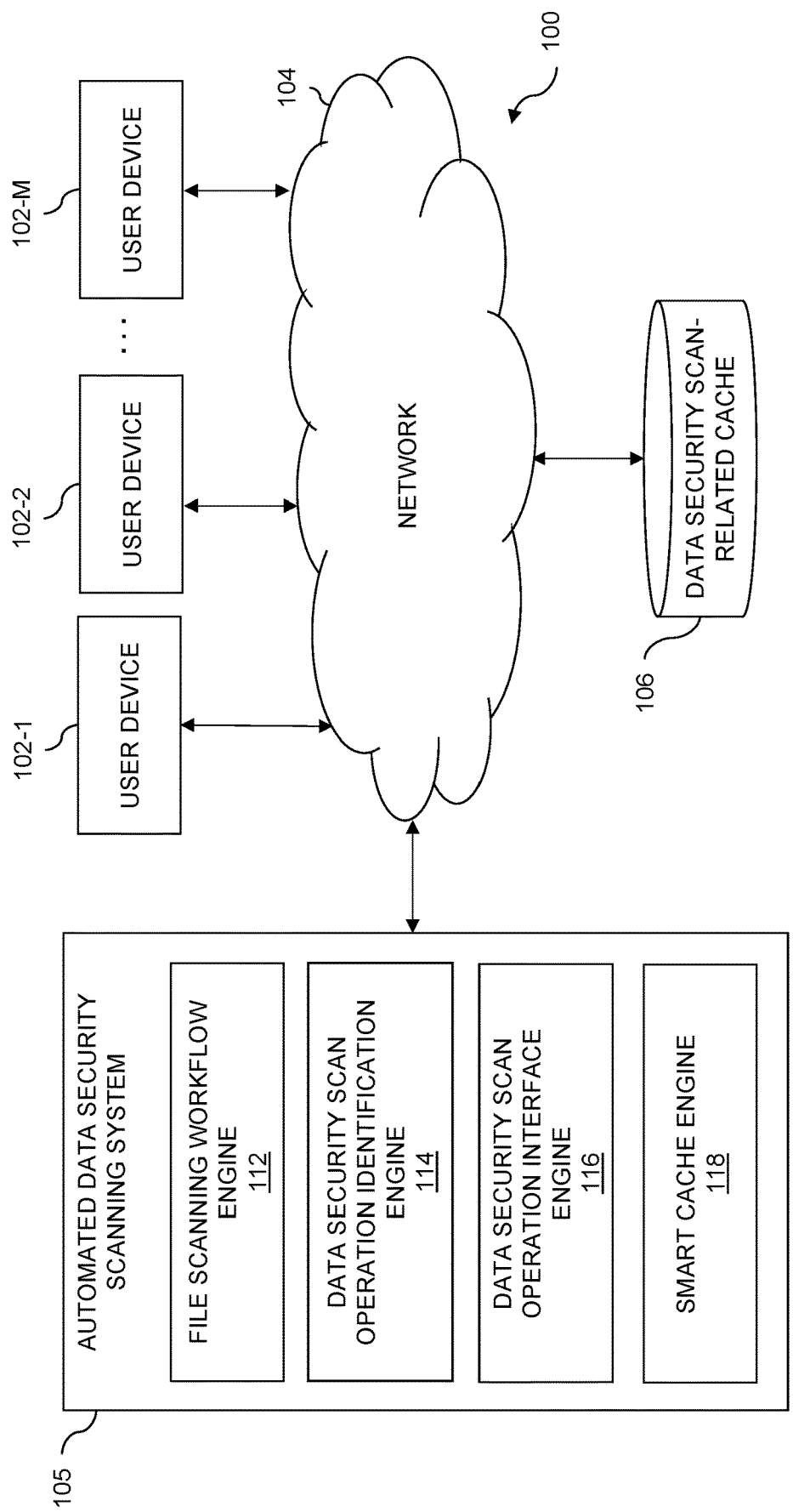
FIG. 1 shows an information processing system configured for automatically performing varied security scans on distributed files using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated data security scanning system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated data security scanning system 105 can have an associated data security scan-related cache 106 configured to store data pertaining to data security scanning of various files, which comprise, for example, historical data derived from previous scan operations of one or more files, hashes of one or more files and/or corresponding scan operations, etc.

The data security scan-related cache 106 in the present embodiment is implemented using one or more storage systems associated with automated data security scanning system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated data security scanning system 105 are one or more input-output devices, which illustratively comprise keyboards, displays or other types of input-output devices in any combination. Such input-output devices can be used, for example, to support one or more user interfaces to automated data security scanning system 105, as well as to support communication between automated data security scanning system 105 and other related systems and devices not explicitly shown.

Additionally, automated data security scanning system 105 in the FIG. 1 embodiment is assumed to be implemented using at least one processing device. Each such processing device generally comprises at least one processor and an associated memory, and implements one or more functional modules for controlling certain features of automated data security scanning system 105.

More particularly, automated data security scanning system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated data security scanning system 105 to communicate over the network 104 with the user devices 102, and illustratively comprises one or more conventional transceivers.

The automated data security scanning system 105 further comprises file scanning workflow engine 112, data security scan operation identification engine 114, data security scan operation interface engine 116, and smart cache engine 118.

It is to be appreciated that this particular arrangement of elements 112, 114, 116 and 118 illustrated in the automated data security scanning system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically performing varied security scans on distributed files using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated data security scanning system 105 and data security scan-related cache 106 can be on and/or part of the same processing platform.

An exemplary process utilizing elements 112, 114, 116 and 118 of an example automated data security scanning system 105 in computer network 100 will be described in more detail with reference to the flow diagram of FIG. 7.

Accordingly, at least one embodiment includes automatically performing varied security scans on distributed files using machine learning techniques. As further detailed herein, such an embodiment includes implementing a smart virus scanning framework for files from various channels with pluggable providers, wherein such a framework leverages one or more machine learning techniques to build a unique hash of a given file once scanned, thus eliminating the need for scanning the file multiple times. A pluggable framework enables dynamic addition and/or removal of different scanning providers and/or software offerings, and utilizes them in a centralized and consistent manner. Additionally, by exposing the framework as an API, one or more embodiments include enabling the utilization of the capabilities detailed herein from different channels of file transfer.

Utilizing at least one hashing algorithm, one or more embodiments include building a unique hash of a given file after a successful scan thereof, and by caching the hash, such an embodiment includes enabling a smart scanning capability to eliminate the need for re-scanning of the give file if the file does not change. Also, leveraging one or more machine learning techniques, at least one embodiment includes predicting and/or determining an effective (e.g., the optimal) scan provider and/or software offering for an input file based at least in part on historical scan data metrics and a variety of file features (e.g., type, size, source, etc.).

Accordingly, at least one embodiment includes generating and/or implementing an intelligent, pluggable framework that provides a centralized anti-virus scanning gateway for providing scan services to multiple channels (e.g., all channels) of file transfer. Such a framework can work with and/or incorporate one or more existing scanning providers and/or software offerings to abstract complexities around integration and execution. Using the framework, one or more embodiments include determining and maintaining the state of a scan and utilizing a hashing engine to create a unique hash for a given set of scanned files, eliminating the need to re-scan if the same file appears without any changes. Additionally, as further detailed herein, such an embodiment includes leveraging one or more machine learning techniques to predict which anti-virus scan provider and/or offering is most efficient and/or optimized for a given scan based at least in part on historical scan data and a variety of file-related features (e.g., type of file, size of file, file source, etc.).

The above-noted framework provides capability for scanning files received from different types of channels including, for example, transmission in managed file transfer (MFT) pathways, attachments in various portals, APIs, etc. At least one embodiment includes enabling dynamic addition and/or removal of different virus scanning providers and/or offerings to the framework by abstracting integration and execution information. Additionally, such an embodiment includes using at least one caching store that stores the results of the scan of a given file and a unique identifier attributed to the given file by utilizing at least one advanced hashing algorithm. Generating and utilizing such a unique identifier eliminates redundant scanning of the same file and improves file management performance.

One or more capabilities of a smart anti-virus scanning framework, such as detailed herein in connection with at least one embodiment (e.g., the example embodiment depicted in FIG. 1) can be achieved by implementing a file scanning workflow engine (e.g., element 112 in FIG. 1), a smart cache engine (e.g., element 118 in FIG. 1), a data security scan operation identification engine (e.g., element 114 in FIG. 1), and a pluggable data security scan operation interface engine (e.g., element 116 in FIG. 1). In one or more embodiments, a file scanning workflow engine receives files from multiple channels including, for example, portals, MFT, API attachments, etc. This component embodies the workflow involved in the virus scanning of a file, which can include verifying the previous scan history of the file being sent by invoking a call to the smart cache engine. If the file was previously scanned, the result of that scan is returned from the cache engine. If the file was not previously scanned, based on the response from the smart cache engine, the file scanning workflow engine identifies the best scan provider and/or offering for the file by invoking a request to the data security scan operation identification engine, which leverages one or more machine learning techniques to predict and/or determine the best scan provider and/or offering for the file.

The file and the identified provider/offering name are passed to the data security scan operation interface engine by the file scanning workflow engine, which is responsible for the actual scanning of the file by the selected provider/offering and returning the result. Once the result response is received, the file scanning workflow engine invokes the smart cache engine to store the unique file identifier (hash) and the result of the scan.

In one or more embodiments, a smart cache engine is responsible for maintaining the state and scan result of a file. This state management helps in eliminating the need for duplicate scanning if the same file is sent multiple times through different channels. Such a benefit is achieved, at least in part, by creating a unique identifier for the file by generating a hash and storing the scan result in a persistent cache. Upon receiving a request to verify a past scan result of a file, the smart cache engine searches the cache with the identifier of the file (i.e., the hash) and returns the result of the scan, if found.

Figure 2:
FIG. 2 shows an example code snippet for implementing at least a portion of a hashing algorithm in an illustrative embodiment.

FIG. 2 shows an example code snippet for implementing at least a portion of a hashing algorithm in an illustrative embodiment. In this embodiment, example code snippet 200 is executed by or under the control of at least one processing system and/or device. For example, the example code snippet 200 may be viewed as comprising a portion of a software implementation of at least part of automated data security scanning system 105 of the FIG. 1 embodiment.

The example code snippet 200 illustrates creating a hash and/or digest of a given file using a secure hashing algorithm (SHA), namely, a SHA256 algorithm (which, for example, can be derived from a Python library). By reading the file in chunks, a large file can be efficiently processed for creating a digest. The example implementation shown in FIG. 2 depicts a Python code snippet which creates the hash of the file provided. Once the file is scanned for data security (e.g., viruses) the first time, the unique hash and/or digest, along with the result of the scan (both in error/problem and non-error/non-problem situations) is cached (e.g., in at least one cache) for future search and/or reference. In one or more embodiments, additional metadata including the scan provider and time taken for the scan are captured for analytics and building insights for future predictions. Such metadata can also be cached.

It is to be appreciated that this particular example code snippet shows just one example implementation of at least a portion of a hashing algorithm, and alternative implementations of the process can be used in other embodiments.

Also, as detailed herein, in at least one embodiment, a data security scan operation identification engine is responsible for predicting and/or determining the best and/or optimal scan provider and/or offering for the specific file provided. Such an engine includes leveraging one or more machine learning algorithms and training such algorithms using historical scan data that includes multi-dimensional features for prediction. In one or more embodiments, predicting and/or selecting the most optimized virus scan provider and/or offering includes utilizing at least one machine learning classifier. Such a classifier can include, for example, one or more classification algorithms including logistics regression, decision tree-based classifiers (e.g., random forest classifiers, gradient boosting classifiers, etc.), and/or one or more neural network-based classifiers.

Referring again to the above-noted multi-dimensional features for prediction, such features can include, for example, file type, file size, channel (e.g., portal, MFT, messaging, API, etc.), source of the file (e.g., internal, external, etc.), scan result (e.g., pass or fail), scan time, and scan provider and/or offering.

As a shallow learning option, one or more embodiments can include using an ensemble bagging technique with a random forest algorithm as a multi-class classification approach for predicting class representing the scan provider. In such an embodiment, a random forest algorithm uses bagging (i.e., bootstrap aggregating) to generate predictions; this can include using multiple classifiers (e.g., in parallel), each trained on different data samples and different features. This reduces the variance and the bias stemming from using a single classifier, and the final classification is achieved by aggregating the predictions that were made by the different classifiers.

Additionally, in one or more embodiments, a random forest algorithm is composed of multiple decision trees, and each decision tree is constructed using different features and different data samples (which, for example, can reduce bias and variance). In the training process, the trees are constructed using training data, and in the testing process, each new prediction that needs to be made is processed through the different decision trees, each decision tree yielding a score and the final prediction in determined by voting (e.g., which class got the majority of votes). In at least one embodiment, a random forest classifier uses multinomial and/or multi-class classification, meaning that the results of the classification would be one of a few types of classes. In one or more embodiments, each class represents a scan provider, and the model predicts one of the classes (i.e., scan providers) with a confidence score. In such an embodiment, the multiple independent variables (i.e., X values) can include the file type, files size, channel, source, etc., whereas the target variable (i.e., Y value) is the scan provider class predicted and/or recommended by the model.

Figure 3:
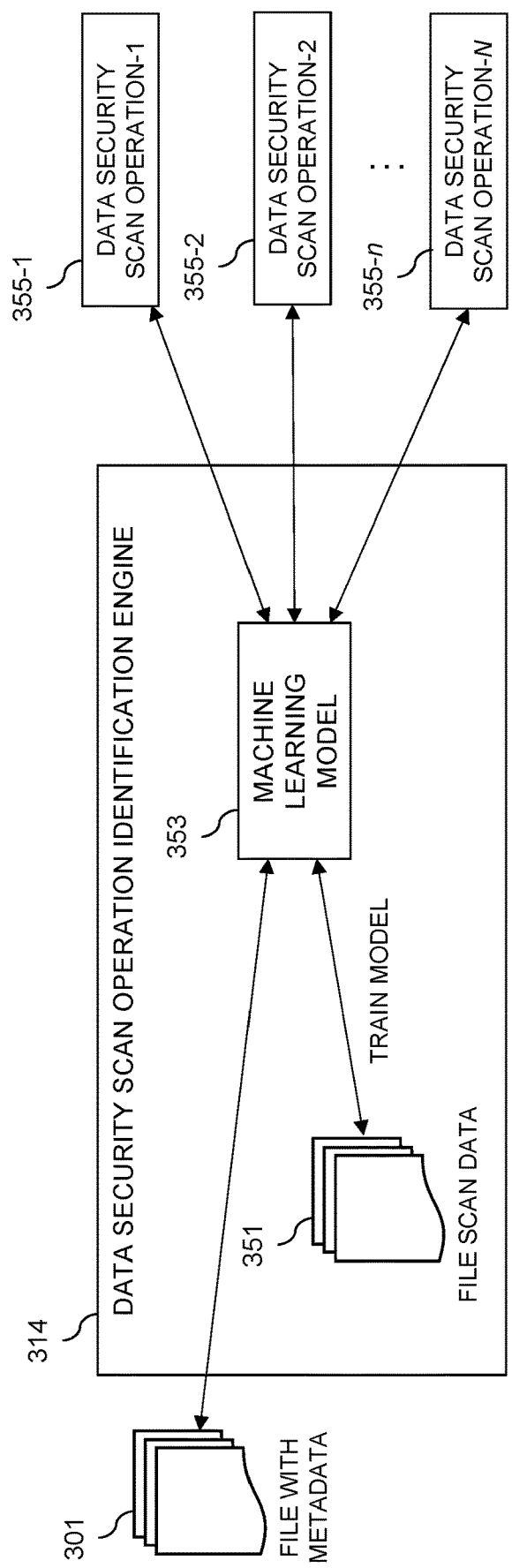
FIG. 3 shows an example component architecture diagram of data security scan operation identification engine in an illustrative embodiment.

FIG. 3 shows an example component architecture diagram of data security scan operation identification engine in an illustrative embodiment. By way of illustration, FIG. 3 depicts machine learning model 353, of data security scan operation identification engine 314, which is trained by historical file scan data 351. Once trained, machine learning model 353 processes an input file with corresponding metadata 301 to predict and/or identify which of multiple data security scan operations 355-1, 355-2, . . . 355-n (e.g., providers and/or offerings) is to be used to scan the input file.

In at least one example embodiment, the data security scan operation identification engine can be built using sklearn libraries with the Python programming language.

By way merely of illustration, FIG. 4 shows an example code snippet for implementing a multi-class classification using a random forest algorithm to identify a data security scan operation for a given file in an illustrative embodiment. In this embodiment, example code snippet 400 is executed by or under the control of at least one processing system and/or device. For example, the example code snippet 400 may be viewed as comprising a portion of a software implementation of at least part of automated data security scanning system 105 of the FIG. 1 embodiment.

The example code snippet 400 illustrates importing libraries including SciKitLearn, Pandas and NumPy, an initial step for achieving multi-class classification using random forest to predict an optimized scan provider and/or offering, in accordance with an example embodiment.

It is to be appreciated that this particular example code snippet shows just one example implementation of a multi-class classification using a random forest algorithm to identify a data security scan operation for a given file, and alternative implementations of the process can be used in other embodiments.

Figure 5:
FIG. 5 shows an example code snippet for reading a file scan history file to create training data in an illustrative embodiment.

FIG. 5 shows an example code snippet for reading a file scan history file to create training data in an illustrative embodiment. In this embodiment, example code snippet 500 is executed by or under the control of at least one processing system and/or device. For example, the example code snippet 500 may be viewed as comprising a portion of a software implementation of at least part of automated data security scanning system 105 of the FIG. 1 embodiment.

The example code snippet 500 illustrates creating data as a comma-separated values (CSV) file, which is read to a Pandas data frame. The data are then split into training and testing sets using a train_test_split function of the sklearn library. By way merely of example, the training set can contain 70% of the observations while the testing set can contain 30% of the observations.

It is to be appreciated that this particular example code snippet shows just one example implementation of reading a file scan history file to create training data, and alternative implementations of the process can be used in other embodiments.

FIG. 6 shows an example code snippet creating a random forest classifier using a sklearn library with the criterion hyperparameter as entropy in an illustrative embodiment. In this embodiment, example code snippet 600 is executed by or under the control of at least one processing system and/or device. For example, the example code snippet 600 may be viewed as comprising a portion of a software implementation of at least part of automated data security scanning system 105 of the FIG. 1 embodiment.

The example code snippet 600 illustrates training the model using the training data sets, both independent variables (X_train) and target variable (Y_train). Once trained, the model is asked to predict by passing the test data of independent variable (X_test). The prediction(s), accuracy and confusion matrix are printed. Also, in one or more embodiments, hyperparameter tuning can be carried out to improve the accuracy of the model.

It is to be appreciated that this particular example code snippet shows just one example implementation of creating a random forest classifier using a sklearn library with the criterion hyperparameter as entropy, and alternative implementations of the process can be used in other embodiments.

As also detailed herein, a pluggable data security scan operation interface engine is responsible for providing a flexible fabric to plug scan providers and/or offerings, which allows the framework to add and remove various scan providers and/or offerings. This engine abstracts complexities of interfacing with different scan providers and/or offerings. For example, scan providers typically present various forms and patterns that can include API-based techniques, command-line interface-based (CLI-based) techniques, cloud-based techniques, etc. The data format for each scan provider and/or offering can also vary. Accordingly, a data security scan operation interface engine abstracts such integrations and data mapping complexities of various scan providers and enables a single interface mechanism to request a file scan. In one or more embodiments, the data security scan operation interface engine exposes an API that accepts and/or processes scan provider name along with the file (to be scanned), routes the file to the determined scan provider (determined as detailed herein), and creates the appropriate data format for the provider scan.

As such, at least one embodiment includes assuming that different scan providers adopt different hosting mechanisms (e.g., CLI-based, container-hosted, API-based, cloud-based, etc.), and the data security scan operation interface engine provides the abstraction to work with all types of hosting.

As also detailed herein, one or more embodiments include implementing a scan interface engine which accepts the file required to be scanned and the scan provider and/or offering selected by the data security scan operation identification engine. In such an embodiment, configurations required to orchestrate between different virus scan processes are set-up and maintained via the scan interface engine. Data pertaining to scan providers can be plugged into an orchestrator component, which can perform one or more automated actions. For example, for a CLI-based scan, the orchestrator will set-up the virus scanning software in at least one virtual systems made available for the scan orchestrator to invoke.

Starting an instance related to the scan can include setting-up the virtual machine which can host the virus scan console, collecting host details, and caching the host details. Once the instance is started and registered in the orchestrator, the orchestrator can route any scanning request to this instance. During run-time, the orchestrator will obtain the host details and invoke the instance to initiate the virus scanning. The steps involved in performing the scan can include storing the file in a temporary path, invoking the scan command, and verifying that the file exists; if no (i.e., the file does not exist), return a "virus/bad file" notification, and if yes (i.e., the file does exist), return a "safe file" notification.

For a container-based scan, for example, the orchestrator obtains an image pulled from a repository and creates the container. Once the container is set-up, the route required to invoke the container is registered in the orchestrator. In at least one embodiment, when the orchestrator routes any requests to the container, the following steps are performed: the file content is sent as a stream, a scan command is invoked, and a scan result is generated; if the result is bad, a "virus/bad file" notification is returned, and if the result is good, a "safe file" notification is returned.

Accordingly, as detailed herein, one or more embodiments include predicting and/or recommending an anti-virus scan provider and/or offering (e.g., the best or optimal scan provider and/or offering) for a given file to be scanned. By utilizing historical file scanning metrics data and leveraging one or more machine learning algorithms, an anti-virus scanning provider and/or offering (e.g., the best and/or optimal anti-virus scan provider and/or offering) is predicted and/or determined for the given file based at least in part on variables such as the type and size of the file, the source of the file, and the channel of the file. Such an embodiment includes leveraging a piping and/or chaining aspect of a regressor and a classifier to generate the prediction. As used herein, the piping and/or chaining aspect refers to a mechanism of using a regressor first for predicting the time taken by all scan providers and/or offerings for a file, and then feeding that data to a classifier to predict the best scan provider and/or offering among existing options for the specific file. It is also to be appreciated that scanning time is merely one of multiple dimensions that can be used for selection by the classifier, and one or more other parameters (including, for example, outcome, type of file, channel, sender, etc.) can be used by the classifier to predict the optimized scan provider and/or offering.

Additionally, as detailed herein, one or more embodiments include implementing at least one smart cache and leveraging at least one hashing algorithm to store the hash of the given file and the result of the corresponding scan, thereby eliminating the need for duplicate scanning of the same file if sent multiple times, thus improving performance and efficiency of file processing in the system and/or enterprise.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 7:
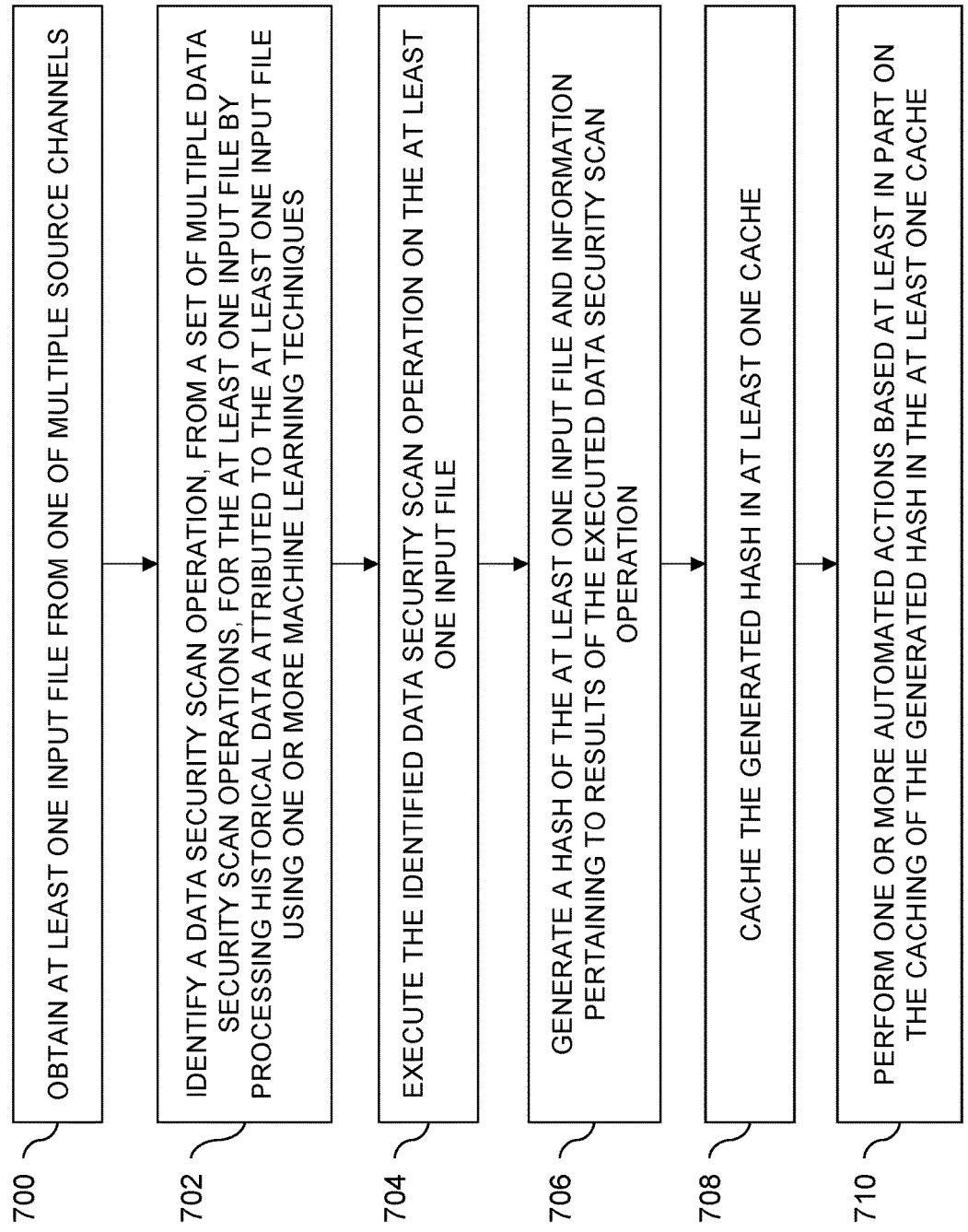
FIG. 7 is a flow diagram of a process for automatically performing varied security scans on distributed files using machine learning techniques in an illustrative embodiment.

FIG. 7 is a flow diagram of a process for automatically performing varied security scans on distributed files using machine learning techniques in an illustrative embodiment. It is to be understood that this particular process is only an example, and additional or alternative processes can be carried out in other embodiments.

In this embodiment, the process includes steps 700 through 710. These steps are assumed to be performed by automated data security scanning system 105 utilizing elements 112, 114, 116 and 118.

Step 700 includes obtaining at least one input file from one of multiple source channels.

Step 702 includes identifying a data security scan operation, from a set of multiple data security scan operations, for the at least one input file by processing historical data attributed to the at least one input file using one or more machine learning techniques. In at least one embodiment, processing historical data attributed to the at least one input file using one or more machine learning techniques includes processing historical data attributed to the at least one input file using at least one machine learning-based ensemble bagging algorithm. Also, in one or more embodiments, processing historical data attributed to the at least one input file using one or more machine learning techniques includes leveraging chaining of at least one regressor and at least one classifier.

Additionally or alternatively, processing historical data attributed to the at least one input file can include processing one or more historical data security scan metrics derived from previous data security scan operations related to the at least one input file and/or processing one or more data features of the at least one input file (e.g., file type, file size, and/or file source channel).

Step 704 includes executing the identified data security scan operation on the at least one input file.

Step 706 includes generating a hash of the at least one input file and information pertaining to results of the executed data security scan operation. In at least one embodiment, generating a hash of the at least one input file and information pertaining to results of the executed data security scan operation includes generating the hash using at least one SHA (e.g., a SHA-384 algorithm, a SHA-512 algorithm, a SHA-512/224 algorithm, a SHA-512/256 algorithm, etc.). Also, in one or more embodiments, generating a hash includes attributing a unique identifier of the at least one input file corresponding to the generated hash.

Step 708 includes caching the generated hash in at least one cache. Step 710 includes performing one or more automated actions based at least in part on the caching of the generated hash in the at least one cache. In at least one embodiment, performing one or more automated actions includes comparing data from an additional input file to the data within the at least one cache prior to executing a data security scan operation on the additional input file.

The techniques depicted in FIG. 7 can also include performing at least one of a dynamic addition of one or more data security scan operations to the a set of multiple data security scan operations and a dynamic removal of one or more data security scan operations from the a set of multiple data security scan operations. Additionally, one or more embodiments can include exposing at least a portion of the method as an application programming interface. Further, at least one embodiment can include training the one or more machine learning techniques based at least in part on results of the executed data security scan operation.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically perform varied security scans on distributed files using machine learning techniques. These and other embodiments can effectively overcome problems associated with redundancy and security gaps.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
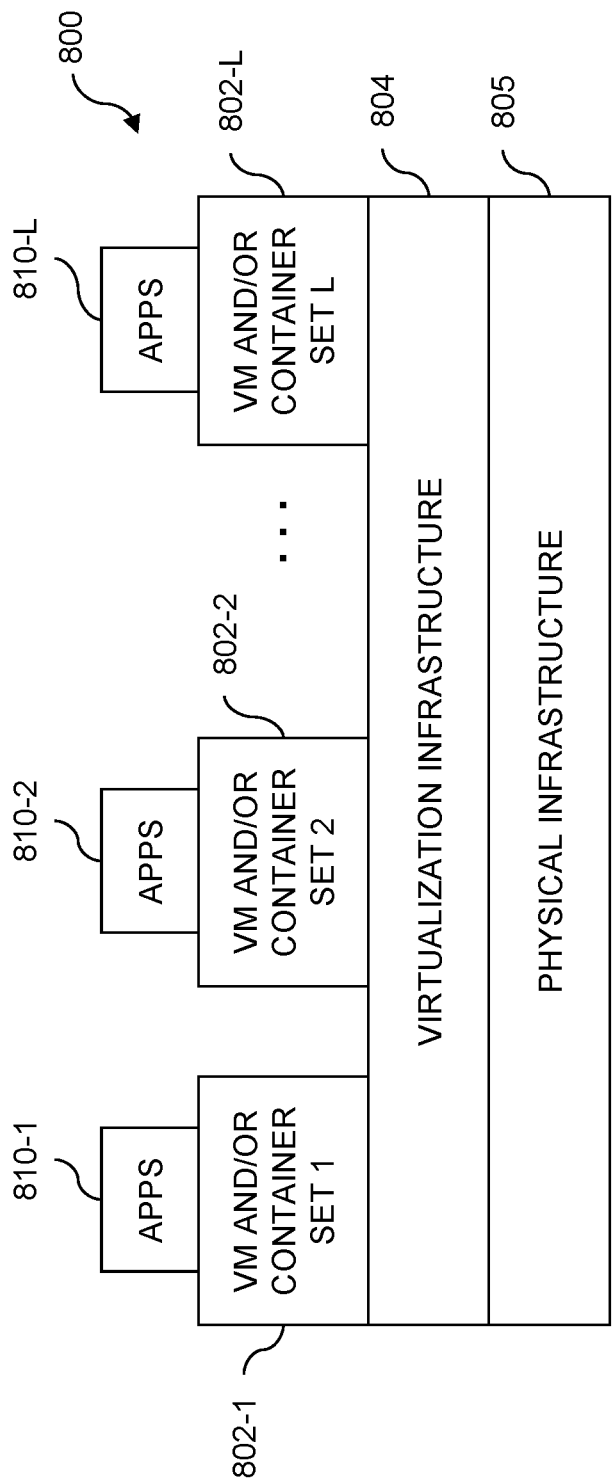
FIGS. 8 and 9 show examples of processing platforms that may be utilized to implement at least a portion of an information processing system in illustrative embodiments.
Figure 9:
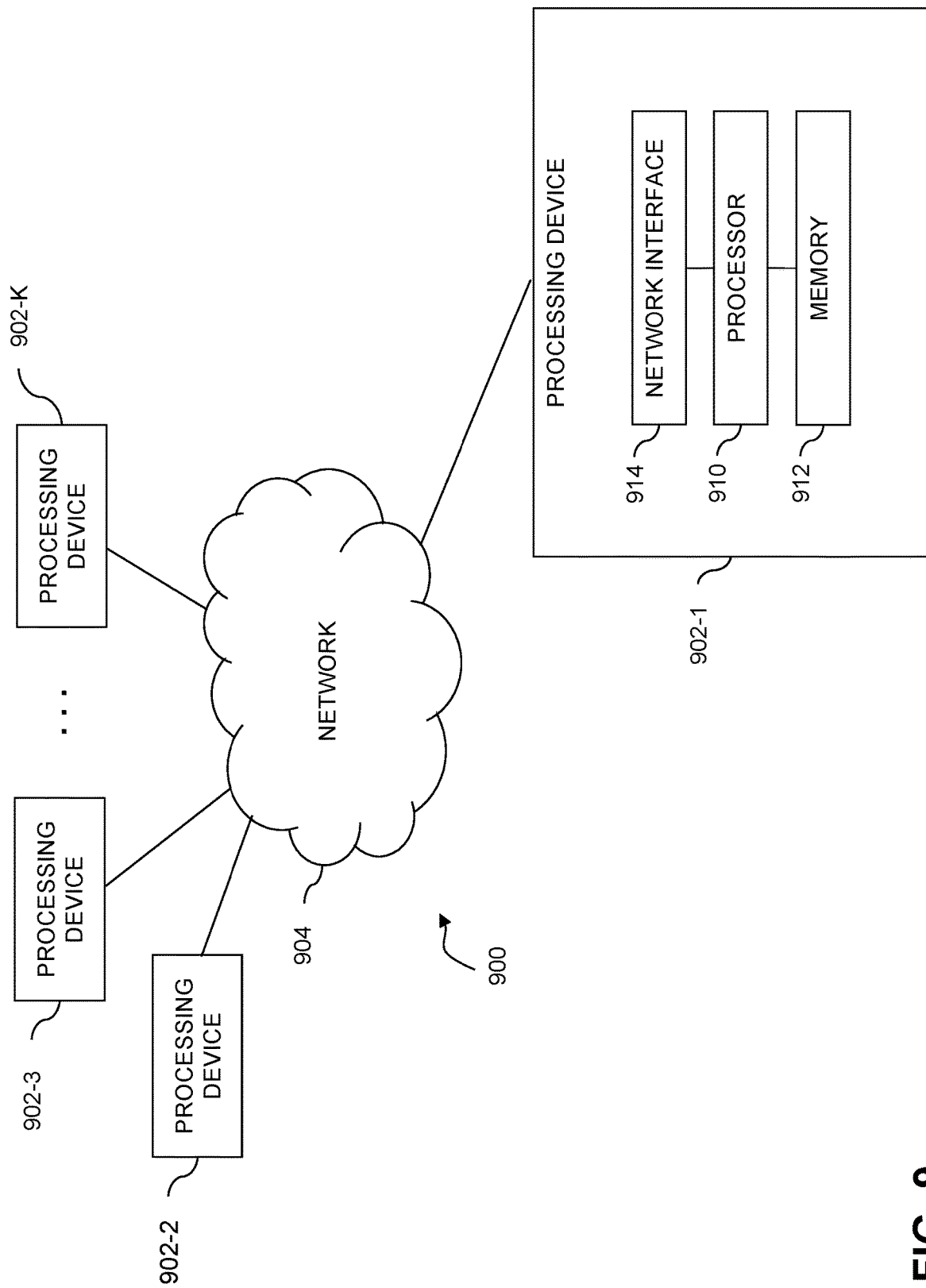

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a CPU, a GPU, a TPU, a microcontroller, an ASIC, a FPGA or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining at least one input file from one of multiple source channels;
identifying a data security scan operation, from a designated set of multiple data security scan operations associated with multiple data security service providers, for the at least one input file by processing historical data attributed to the at least one input file using one or more machine learning techniques;
executing the identified data security scan operation on the at least one input file;
generating a hash of the at least one input file and information pertaining to results of the executed data security scan operation;
caching the generated hash in at least one cache; and
performing one or more automated actions based at least in part on the caching of the generated hash in the at least one cache;
wherein the method is performed by at least one processing device comprising a processor coupled to a memory.

2. The computer-implemented method of claim 1, wherein processing historical data attributed to the at least one input file using one or more machine learning techniques comprises processing historical data attributed to the at least one input file using at least one machine learning-based ensemble bagging algorithm.

3. The computer-implemented method of claim 1, wherein generating a hash of the at least one input file and information pertaining to results of the executed data security scan operation comprises generating the hash using at least one secure hashing algorithm (SHA).

4. The computer-implemented method of claim 1, wherein performing one or more automated actions comprises comparing data from an additional input file to the data within the at least one cache prior to executing a data security scan operation on the additional input file.

5. The computer-implemented method of claim 1, wherein processing historical data attributed to the at least one input file comprises processing one or more historical data security scan metrics derived from previous data security scan operations related to the at least one input file.

6. The computer-implemented method of claim 1, wherein processing historical data attributed to the at least one input file comprises processing one or more data features of the at least one input file.

7. The computer-implemented method of claim 6, wherein the one or more data features of the at least one input file comprise at least one of file type, file size, and file source channel.

8. The computer-implemented method of claim 1, wherein processing historical data attributed to the at least one input file using one or more machine learning techniques comprises leveraging chaining of at least one regressor and at least one classifier.

9. The computer-implemented method of claim 1, wherein generating a hash comprises attributing a unique identifier of the at least one input file corresponding to the generated hash.

10. The computer-implemented method of claim 1, further comprising:
performing at least one of a dynamic addition of one or more data security scan operations to the a set of multiple data security scan operations and a dynamic removal of one or more data security scan operations from the a set of multiple data security scan operations.

11. The computer-implemented method of claim 1, further comprising:
exposing at least a portion of the method as an application programming interface.

12. The computer-implemented method of claim 1, further comprising:
training the one or more machine learning techniques based at least in part on results of the executed data security scan operation.

13. A non-transitory processor-readable storage medium having stored therein program code of one or more software programs, wherein the program code when executed by at least one processing device causes the at least one processing device:
to obtain at least one input file from one of multiple source channels;
to identify a data security scan operation, from a designated set of multiple data security scan operations associated with multiple data security service providers, for the at least one input file by processing historical data attributed to the at least one input file using one or more machine learning techniques;
to execute the identified data security scan operation on the at least one input file;
to generate a hash of the at least one input file and information pertaining to results of the executed data security scan operation;
to cache the generated hash in at least one cache; and
to perform one or more automated actions based at least in part on the caching of the generated hash in the at least one cache.

14. The non-transitory processor-readable storage medium of claim 13, wherein processing historical data attributed to the at least one input file using one or more machine learning techniques comprises processing historical data attributed to the at least one input file using at least one machine learning-based ensemble bagging algorithm.

15. The non-transitory processor-readable storage medium of claim 13, wherein generating a hash of the at least one input file and information pertaining to results of the executed data security scan operation comprises generating the hash using at least one SHA.

16. The non-transitory processor-readable storage medium of claim 13, wherein performing one or more automated actions comprises comparing data from an additional input file to the data within the at least one cache prior to executing a data security scan operation on the additional input file.

17. An apparatus comprising:
at least one processing device comprising a processor coupled to a memory;
the at least one processing device being configured:
to obtain at least one input file from one of multiple source channels;
to identify a data security scan operation, from a designated set of multiple data security scan operations associated with multiple data security service providers, for the at least one input file by processing historical data attributed to the at least one input file using one or more machine learning techniques;
to execute the identified data security scan operation on the at least one input file;
to generate a hash of the at least one input file and information pertaining to results of the executed data security scan operation;
to cache the generated hash in at least one cache; and
to perform one or more automated actions based at least in part on the caching of the generated hash in the at least one cache.

18. The apparatus of claim 17, wherein processing historical data attributed to the at least one input file using one or more machine learning techniques comprises processing historical data attributed to the at least one input file using at least one machine learning-based ensemble bagging algorithm.

19. The apparatus of claim 17, wherein generating a hash of the at least one input file and information pertaining to results of the executed data security scan operation comprises generating the hash using at least one SHA.

20. The apparatus of claim 17, wherein performing one or more automated actions comprises comparing data from an additional input file to the data within the at least one cache prior to executing a data security scan operation on the additional input file.

* * * * *

UNITED STATES PATENT AND TRADEMARK OFFICE
CERTIFICATE OF CORRECTION

PATENT NO. : 12,086,265 B2
APPLICATION NO. : 17/579073
DATED : September 10, 2024
INVENTOR(S) : Bijan Kumar Mohanty et al.

Page 1 of 1

It is certified that error appears in the above-identified patent and that said Letters Patent is hereby corrected as shown below:

In the Claims

In Claim 10, Column 15, Lines 39-43, replace:
"performing at least one of a dynamic addition of one or more data security scan operations to the a set of multiple data security scan operations and a dynamic removal of one or more data security scan operations from the a set of multiple data security scan operations."

With:
-- performing at least one of a dynamic addition of one or more data security scan operations to the set of multiple data security scan operations and a dynamic removal of one or more data security scan operations from the set of multiple data security scan operations. --

Signed and Sealed this
Eleventh Day of March, 2025

Coke Morgan Stewart
*Acting Director of the United States Patent and Trademark Office*